Sept. 11, 1956 E. G. OPSAHL 2,762,465
BRAKE BEAM
Filed July 12, 1952 3 Sheets-Sheet 1
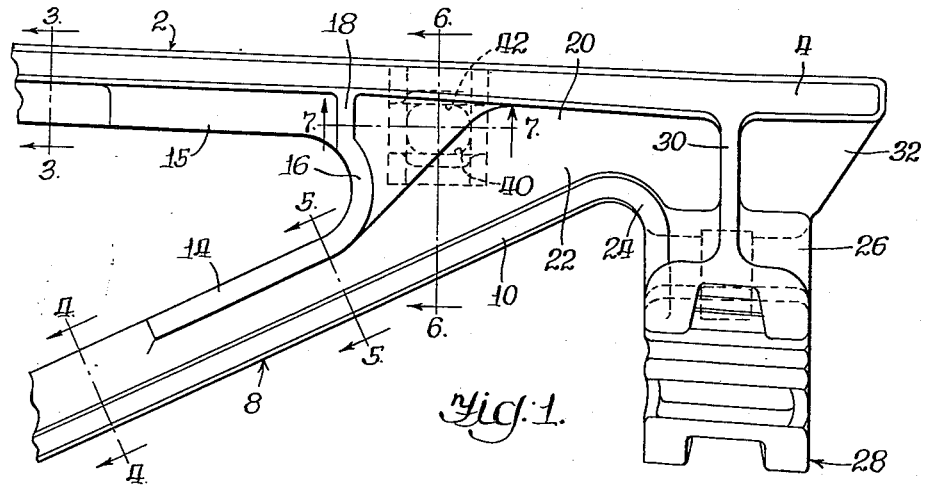
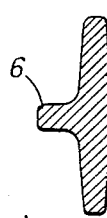
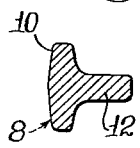
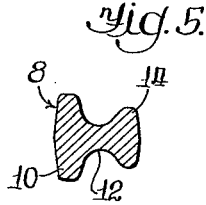
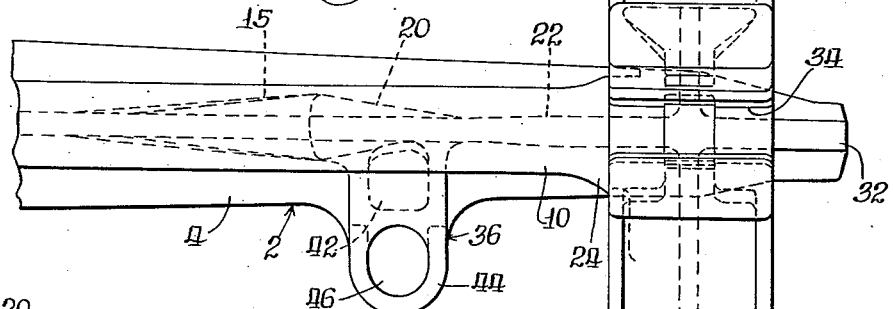
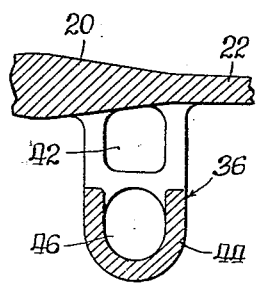
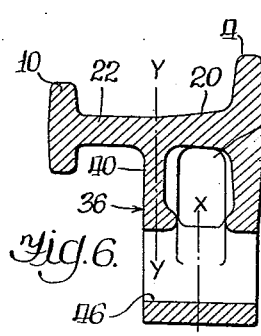
INVENTOR.
Eugene G. Opsahl
BY
Atty.

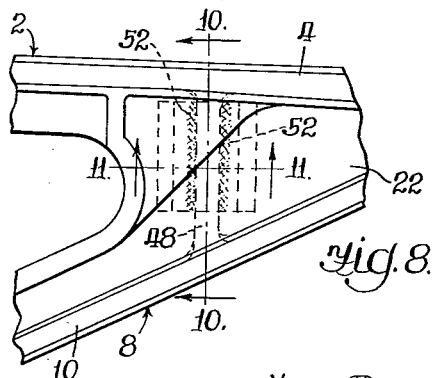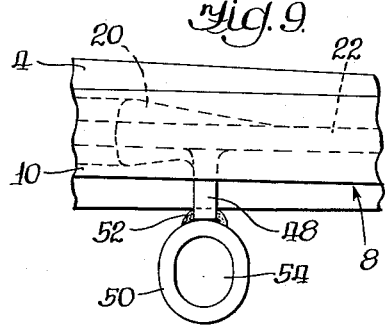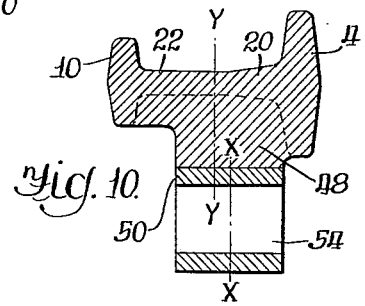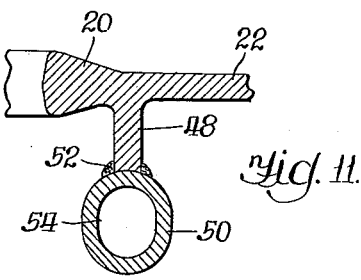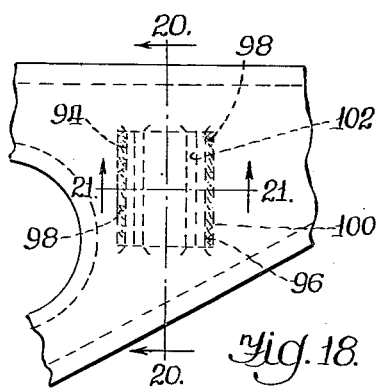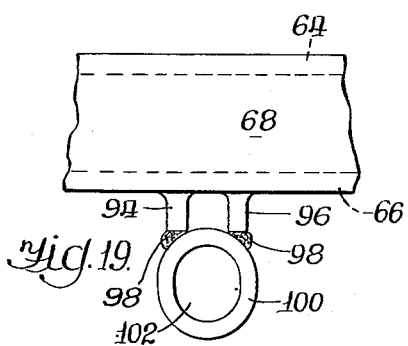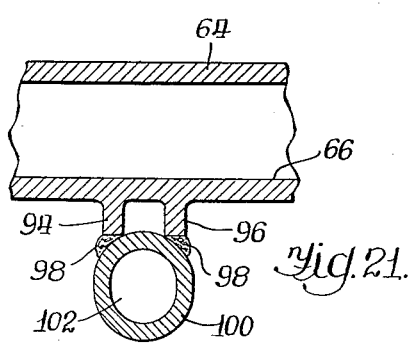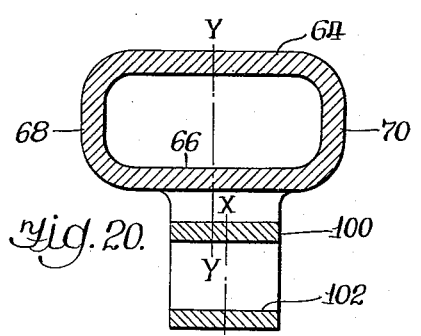
INVENTOR.
Eugene G. Opsahl

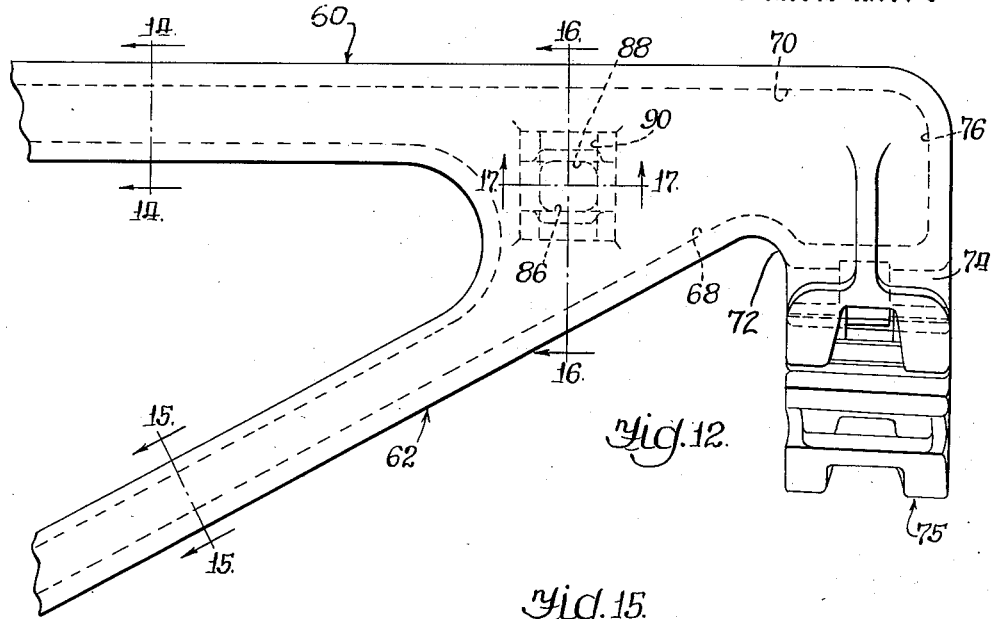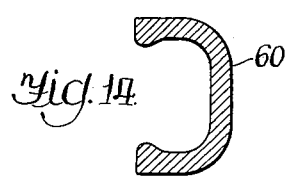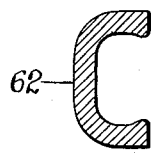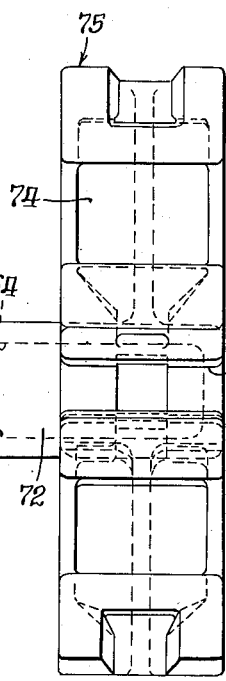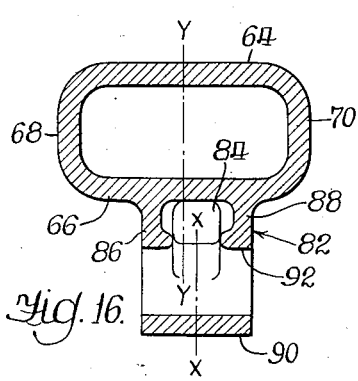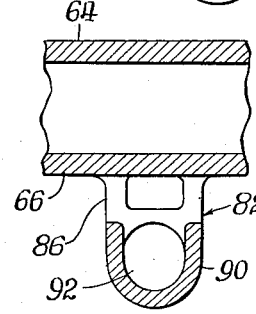

United States Patent Office 2,762,465
Patented Sept. 11, 1956

2,762,465

BRAKE BEAM

Eugene G. Opsahl, Chicago, Ill., assignor to American Steel Foundries, Chicago, Ill., a corporation of New Jersey Application July 12, 1952, Serial No. 298,569

4 Claims. (Cl. 188—222.6)

This invention relates to truss type railway brake beams and more particularly to a novel brake beam casting having an integral safety support.

A primary object of the invention is to devise an arrangement in which one or more vertical webs are cast on the underside of the brake beam and are provided with a safety support aperture or eye.

Another object of the invention is to arrange the depending web or webs in such manner as to reinforce the ends of the beams outboardly of the juncture between the tension and compression members thereof.

A further object of the invention is to devise a brake beam, such as above described, wherein the casting is formed to simplify coring thereof.

The foregoing and other objects and advantages of the invention will become apparent from a consideration of the following specification and the accompanying drawings, wherein:

Figure 1 is a fragmentary top plan view of a brake beam casting embodying the invention, only one end of the casting being illustrated, inasmuch as it is preferably symmetrical about its transverse center line;

Figure 2 is a front elevational view of the structure shown in Figure 1;

Figures 3 to 7, inclusive, are sectional views on the lines 3—3, 4—4, 5—5, 6—6 and 7—7, respectively, of Figure 1;

Figure 8 is a fragmentary top plan view of a modified brake beam casting embodying the invention;

Figure 9 is a front elevational view of the structure shown in Figure 8;

Figures 10 and 11 are sectional views taken respectively on the lines 10—10 and 11—11 of Figure 8;

Figure 12 is a fragmentary top plan view of a brake beam embodying another modification of the invention;

Figure 13 is a front elevational view of the structure shown in Figure 12;

Figures 14 to 17, inclusive, are sectional views taken respectively on the lines 14—14, 15—15, 16—16 and 17—17 of Figure 12;

Figure 18 is a fragmentary top plan view of a brake beam casting embodying still another modification of the invention;

Figure 19 is a front elevational view of the structure shown in Figure 18, and

Figures 20 and 21 are sectional views taken, respectively, on the lines 20—20 and 21—21 of Figure 18.

Describing the invention in detail and referring first to the embodiment illustrated in Figures 1 to 7, the brake beam casting illustrated therein is preferably formed of steel and comprises a compression member, generally designated 2. This member is preferably of T-section having a rear substantially vertical web 4 defining the head of the T and having a forward substantially horizontal web 6 defining the leg of the T. The novel brake beam casting also comprises a tension member, generally designated 8, having a forward substantially vertical web 10 defining the head of the T and having a rear substantially horizontal web 12 defining the leg of the T. It may be noted that the tension and compression members 2 and 8 are interconnected in the usual manner by a strut or fulcrum (not shown) affording conventional connecting means for an associated brake lever (not shown).

The tension member 8, at its outboard end, also comprises a rear substantially vertical web 14 defining with the webs 10 and 12 an H-section, as seen in Figure 5, the web 12 forming the cross bar of the H. The tension member web 14 comprises an arcuate segment 16 at its outboard end merging with the outboard end of the compression member web 6, which flares in thickness toward its outboard end, or in other words, tapers in thickness as at 15 from its juncture with the arcuate segment 16 of the tension member web 14.

The arcuate segment 16 of the web 14 is also connected to a substantially linear segment 18, which is connected to the forward edge of the compression member web 4 and is connected to the outboard end of the tapering segment 15 of the compression member web 6.

Outboardly of the web segments 16 and 18, the compression member web 4 and these segments are connected to an outboardly tapering segment 20 of a substantially horizontal web 22, which merges with and flares in width from the outboard end of the tension member web 12, as best seen in Figure 1, said web 22 connecting the vertical webs 4 and 10 outboardly of the tension and compression members. The vertical web 10 extends arcuately along the forward edge of the web 22, as at 24, to merge with the front wall 26 of a conventional brake head generally designated 28.

The web 4 extends outboardly of the segment 18 along the rear edge of the web 22 and is connected to a rear, substantially vertical brake head wall 30; and the web 4 preferably extends outboardly of a rear brake head wall 30 to merge with a horizontal brake head wall 32 and define a support outboardly of the brake head wall 30 for engagement with a well known ledge (not shown) on a supporting structure, such as a freight car truck side frame (not shown). Also the brake head 28 may be provided with a conventional socket 34 for reception of a pivotal hanger (not shown).

Integrally formed on the underside of the web 22 and merging with the tapered segment 20 thereof, is a safety support member 36, which is cored away as at 38 to define a pair of spaced front and rear ribs 40 and 42 extending lengthwise of the beam. The front rib 40 merges with the underside of the web 22 as well as the tapered segment 20 thereof, and the rear web 42 merges with the underside of the web 4. The lower edges of the ribs 40 and 42 are interconnected by an arcuate web 44, defining an eye or opening 46 extending transversely of the beam through the member 36 for the reception of a conventional safety support device for the beam.

A modification of the brake beam illustrated in Figures 1 to 7, is illustrated in Figures 8 to 11, wherein parts corresponding to those previously described are identified by corresponding numerals. In this modification, a single depending rib or web 48 extends transversely of the beam and is cast on the underside of the web 22 and its tapered portion 20, said rib 48 merging with the vertical webs 4 and 10, respectively. A ring or loop member 50 is welded, as at 52, to the underside of the rib 48 lengthwise thereof, as best seen in Figure 8, said ring member providing an eye or aperture 54 for the reception of an associated safety support device.

Referring now to the modification illustrated in Figures 12 to 17, the brake beam casting illustrated therein comprises a compression member 60 of U-section and a tension member 62 of U-section merging at their outboard ends to define a box section having top and bottom webs 64 and 66, and front and rear webs 68 and 70, the web 68 terminating at its outboard end in an arcuate segment 72 (Figure 12) merging with the inboard edge of a front wall 74 of a conventional brake head 75. The rear web 70 also terminates at its outboard end in an arcuate segment 76, the forward edge of which merges with the outboard edge of the brake head wall 74, which is preferably provided with a conventional hanger socket 80 (Figure 13).

The underside of the web 66 is formed with a boss or lug member 82 depending therefrom and cored away, as at 84 (Figure 17) to define a pair of spaced, longitudinally extending front and rear ribs 86 and 88, respectively, the lower ends of which are interconnected by an arcuate web 90 defining a transverse eye or aperture 92 for the reception of associated safety support means.

The modification of Figures 18 to 21, inclusive, is similar to that shown in Figures 12 to 17, and corresponding parts are identified by corresponding numerals. In the modification of Figures 18 to 21, the underside of the web 66 is provided with spaced transversely extending ribs 94 and 96, the lower ends of which are welded as at 98 to a ring or loop member 100, having a transversely extending eye or aperture 102 for the reception of associated safety support means.

It may be noted that in each of the embodiments, the transverse vertical center plane X—X of the eye or aperture is preferably offset rearwardly with respect to the longitudinal vertical center plane Y—Y of the brake beam, as seen in Figures 6, 10, 16 and 20, whereby forward tipping of the beam due to the weight of the brake heads may be effectively counterbalanced by support means within the eye or aperture of the beam at the underside thereof.

I claim:

1. A cast steel brake beam comprising tension and compression members, a substantially horizontal web connected to said members and extending outboardly thereof, a brake head integrally formed on said web, a substantially vertical rib formed integrally on the underside of said web, and a member carried by the lower end of said rib in vertically spaced relation to the beam and having an aperture extending transversely of the beam for the reception of associated support means, the transverse center plane of the aperture being offset rearwardly from and parallel to the longitudinally vertical center plane of the beam.

2. A cast steel brake beam comprising tension and compression members, an end portion extending outboardly thereof and carrying a brake head, a rib depending from the underside of said portion and integrally formed therewith, and a member supported by said rib in vertically spaced relation to the beam having an aperture for the reception of associated support means, said rib extending lengthwise of the beam and being formed as a continuation of a substantially vertical compression web.

3. A cast steel brake beam comprising tension and compression members and an end portion extending outboardly therefrom and carrying a brake head, a boss integrally formed on the underside of said end portion, said boss being cored away to define spaced depending ribs extending lengthwise of the beam, and an arcuate web interconnecting the lower ends of said ribs and defining therewith an aperture extending transversely of the beam for the reception of associated support means, said aperture being in vertically spaced relation to the beam, one of said ribs being formed as an extension on the lower end of a substantially vertical compression member web, and the other of said ribs being intersected by the longitudinal vertical center plane of the beam.

4. A cast steel brake beam comprising tension and compression members and an end portion extending outboardly therefrom and carrying a brake head, a boss integrally formed on the underside of said end portion, said boss being cored away to define spaced depending ribs extending lengthwise of the beam, and an arcuate web interconnecting the lower ends of said ribs and defining therewith an aperture extending transversely of the beam for the reception of associated support means, said aperture being in vertically spaced relation to the beam, one of said ribs being formed as an extension on the lower end of a substantially vertical compression member web, and the other of said ribs being intersected by the longitudinal vertical center plane of the beam, the transverse vertical center plane of the aperture being offset rearwardly from and parallel to the longitudinal vertical center plane of the beam.

References Cited in the file of this patent

UNITED STATES PATENTS

| | | |
|---|---|---|
| 558,965 | Lamkey | Apr. 28, 1896 |
| 589,270 | Player | Aug. 31, 1897 |
| 744,027 | Bettendorf | Nov. 17, 1903 |
| 2,459,323 | Kass | Jan. 18, 1949 |
| 2,499,905 | Cottrell | Mar. 7, 1950 |